United States Patent [19]
Siler

[11] 3,783,496
[45] Jan. 8, 1974

[54] METHOD OF ASSEMBLING MEMBERS HAVING MISALIGNED HOLES

[76] Inventor: Joseph T. Siler, 1678 Columbia Dr., Mountain View, Calif.

[22] Filed: Aug. 31, 1972

[21] Appl. No.: 285,528

Related U.S. Application Data

[60] Continuation-in-part of Ser. Nos. 785,323, Dec. 19, 1968, Pat. No. 3,590,461, and Division of Ser. No. 97,540, Dec. 14, 1970, Pat. No. 3,725,993.

[52] U.S. Cl. ........................ 29/464, 287/189.36 F
[51] Int. Cl. ............................................. B23q 3/00
[58] Field of Search ............... 29/464, 271, 240; 287/189.36 F

[56] References Cited
UNITED STATES PATENTS

| | | | |
|---|---|---|---|
| 2,404,456 | 7/1946 | Pierce | 29/464 |
| 2,920,682 | 1/1960 | Lindberg | 29/464 UX |
| 3,006,443 | 10/1961 | Siler | 29/464 UX |
| 3,203,082 | 8/1965 | Robbins | 287/189.36 F X |
| 3,257,720 | 6/1966 | Siler | 29/464 |
| 3,336,653 | 8/1967 | Symons | 29/271 |
| 3,499,258 | 3/1970 | Durand | 27/464 X |

*Primary Examiner*—Charlie T. Moon
*Attorney*—Julian Caplan, Esq.

[57] ABSTRACT

Following are disclosed methods and apparatus for facilitating the alignment of the eccentric bores of "work side" and "blind side" bushings used in the misaligned, fastener receiving holes of structural members. A shaft is sized to extend into the eccentric bores, and a latch element is laterally carried by the shaft and adapted to extend into, and retract from at least one indentation in the bore of a selected bushing for rotational orientation thereof. An adjustment bushing is carried by the shaft and has a uniform cylindrical wall thickness equal to the minimum wall thickness of the work side bushing. An alignment collar is also carried by the shaft and has an aperture that receives the shaft, the collar having a larger diameter than the diameter of an engaged bushing to enable application of torque and visual reference for detecting axial angularity misalignment between said bushing and its receiving hole in the structural member. When used with the alignment collar, the adjustment bushing gauges and establishes the position of the blind side bushing to enable insertion of the work side bushing and a fastener in a more efficient manner without need for additional rotation of either the blind side or the work side bushing. Hence, the work side and blind side bushings may be accurately aligned through the utilization of both the alignment collar and the adjustment bushing.

4 Claims, 7 Drawing Figures

PATENTED JAN 8 1974
3,783,496
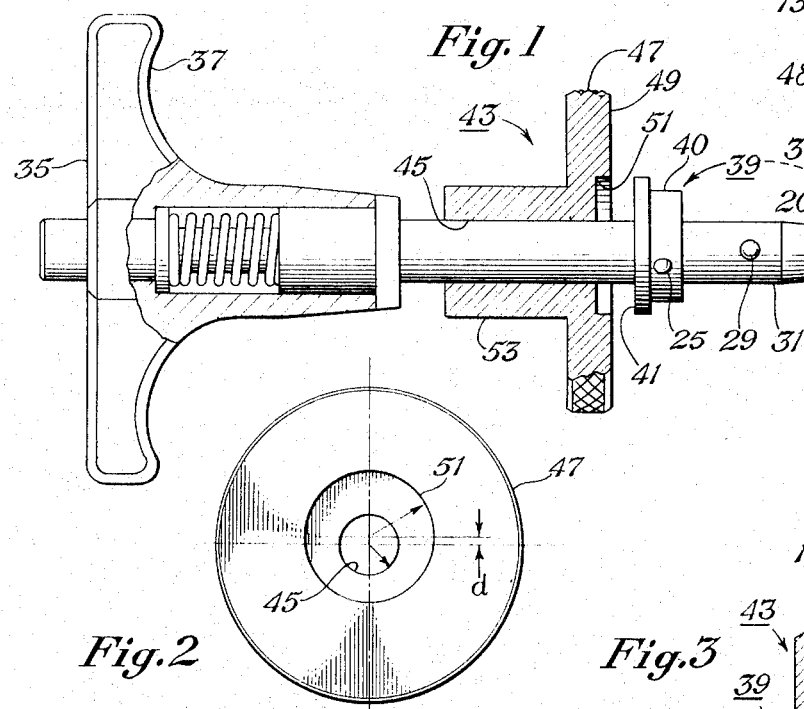
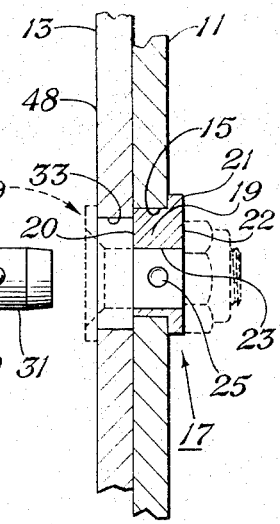
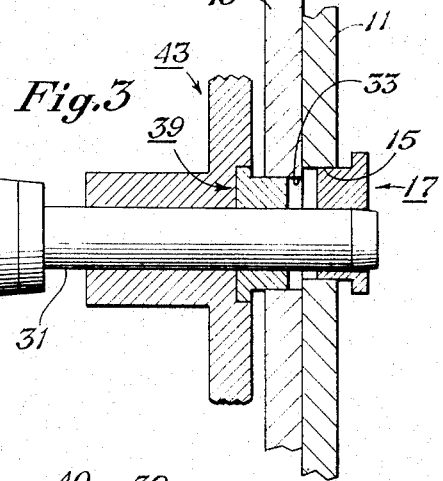
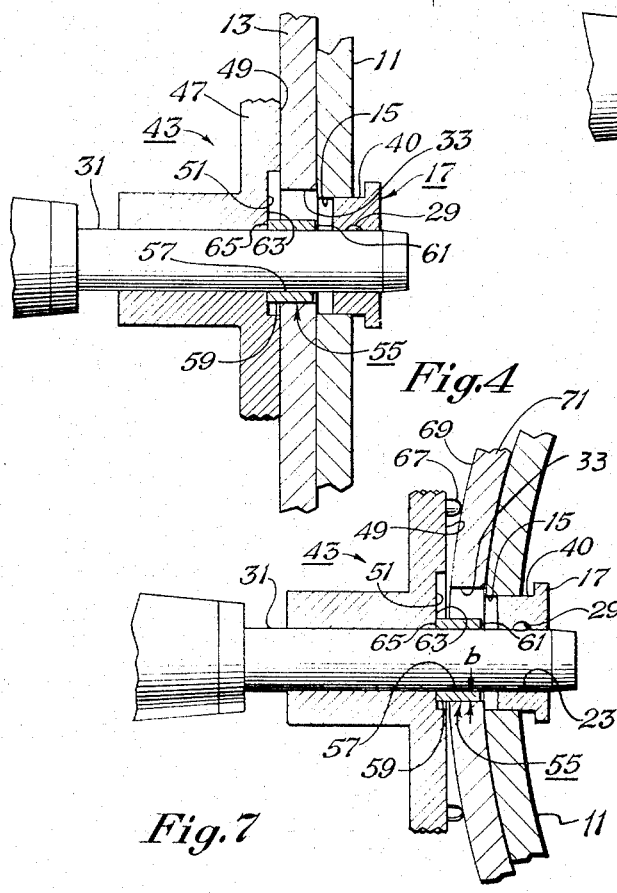
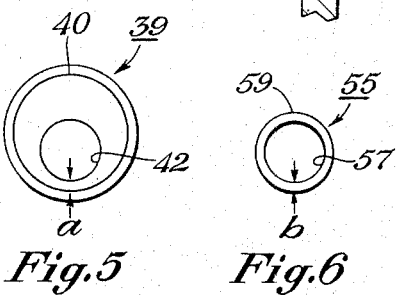
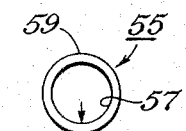

METHOD OF ASSEMBLING MEMBERS HAVING MISALIGNED HOLES

CROSS-REFERENCE TO RELATED APPLICATION:

This application is a continuation-in-part of a copending application entitled "Alignment Means for Bushings Having Eccentric Bores," Ser. No. 785,323, filed Dec. 19, 1968, now U.S. Pat. No. 3,590,461, and is division of Ser. No. 97,540 filed Dec. 14, 1970, now U.S. Pat. No. 3,725,993.

BACKGROUND OF THE INVENTION

1. Field of the Invention

This invention relates to fastener devices, particularly to those used for connecting structural members having misaligned, fastener receiving holes.

2. Description of the Prior Art

In U.S. Pat. Nos. 3,006,443; 3,257,720; and 3,357,730, I disclose new methods and apparatus for connecting structural members having misaligned, fastener receiving holes. In those patents, I explain the use of bushings with eccentric, axially extending bores for such purposes. In U.S. Pat. Nos. 3,257,720 and 3,357,730, I explain the use, among other things, of an elastomer tool for positioning a "blind side" bushing such that its axial bore may be aligned with that of a "work side" bushing. The term "blind side" refers to a structural member, or its bushing, which may be partially or completely hidden from view. For example, a full view of such a member or bushing may be obstructed by another structural member, which may be in full view and thus referred to as the "work side" structural member that carries a "work side" bushing. The utilization of an elastomer tool performs satisfactorily in many instances, but nevertheless has significant disadvantages. To overcome such disadvantages, in U.S. Pat. No. 3,509,618, I provide fastener and assembly means for connecting work and blind side structural members through utilization of a shaft, generally rigid, that extends into the bore and utilizes one or more latch elements that move laterally into one or more indentations in a bushing for positive manipulation thereof.

Further, in the co-pending application, "Alignment Means for Bushing Having Eccentric Bores," Ser. No. 785,323, filed Dec. 19, 1968, now U.S. Pat. No. 3,590,461, I disclose an improvement that utilizes an alignment collar carried by a shaft, having an aperture that receives the shaft, with a collar having a larger diameter than the diameter of the engaged bushing to enable application of torque and to give a visual reference for axial angularity misalignment between said bushing and its receiving hole in the structural member. Thus, more exacting alignment of the bushings is possible, particularly when an initial, limited interference fit between the bushing and its receiving hole (before final assembly) is utilized in the installation procedure.

By way of summary, the inventions described in the above patents and co-pending application are directed to the problem of connecting structural members having misaligned, fastener receiving holes in a precise manner, with superior static strength, and in a manner to minimize fatigue failures in the structural members and fasteners. Moreover, the inventions in U.S. Pat. No. 3,509,618 and co-pending application may be utilized to help insure that neither the work side nor blind side bushing is inadvertently cocked when a fastener such as a bolt is inserted through the eccentric holes and tightened. Otherwise, damage to the bushing or the structural member or the fastener may result.

SUMMARY OF THE INVENTION

The problem of establishing a perpendicular relationship between the axis of the bushings and the work, simultaneously with alignment of the eccentric bores of the bushings, is solved in the above mentioned co-pending application, but the time required to do so is sometimes excessive, and the visual gap between alignment collar and work must be gauged for minute precision. Thus, there remains the problem of quickly locating the precise correct normal relationship between the blind side and work side bushings and the work, such that the bushing eccentric bores are also in precise rotational registry. For this purpose I provide an adjustment bushing, preferably in the form of a right circular cylindrical tube, with an aperture that is best circular in transverse cross-section and concentric with a cylindrical exterior, the wall thickness of the bushing being substantially equal to the minimum wall thickness defined by the eccentric bore and exterior wall surface of the work side bushing. Accurate alignment of the work and blind side bushing is achieved through utilization of the method of inserting the blind side bushing in the blind side structural member, by inserting the adjustment bushing on the shaft, and by positioning the end of the shaft in the blind side bushing, with a latch element of the shaft engaging an associated indentation in the bushing. With the end of the adjustment bushing extending into the bore that receives the work side bushing, and the adjustment collar in contact with the work, the shaft and the blind side bushing are rotated until the point of resistance to rotation is reached, which gauges and establishes the gap between the shaft and the wall of the misaligned hole of the work side structural member to establish the precise proper space for installing the work side bushing. The alignment collar in contact with the work precisely establishes the normality or perpendicularity of the work side bushing relative to the surface of the work side structural member. Hence, both axial alignment and normality are simultaneously quickly and precisely established by the method and apparatus.

BRIEF DESCRIPTION OF THE DRAWING

FIG. 1 is a side elevation view, partially in section, of portions of two structural members, one of which has inserted in an aperture therein a blind side bushing. Also, a work side bushing and alignment collar are inserted on a shaft used to align the bushings;

FIG. 2 is an end view of an alignment collar also shown in FIG. 1;

FIG. 3 is a side elevation view, partially in section, showing the work side bushing and alignment collar in position for manipulation of the work side bushings or for detection of bushing non-normality;

FIG. 4 is a side elevation view, partially in section, showing the alignment collar in contact with the work, and the adjustment bushing carried by the shaft and inserted in the work side bushing receiving hole;

FIG. 5 is an end view of a work side bushing;

FIG. 6 is an end view of the alignment bushing; and

FIG. 7 is a fragmentary side elevation view, partially in section, of a shaft, alignment collar, adjustment bushing, and blind side bushing inserted in the receiving hole of a blind side structural member, both the blind side and work side structural members being curved and engaged by peripherally located protrusions on the alignment collar.

DESCRIPTION OF THE PREFERRED EMBODIMENTS

The numeral 11 in the drawing designates a blind side structural member and the numeral 13 designates an identical work side structural member. Inserted in a slightly tapered hole 15 in the blind side structural member 11 is a blind side bushing 17. This bushing has a body portion 19 (the exterior of which is slightly tapered in this instance) and an enlarged head portion 21. In addition, the bushing has end surfaces 20 and 22 that are perpendicularly oriented relative to the axially extending bore 23. The bore 23 is formed through the enlarged head and body portions of the bushing, being eccentric relative to the central axis of the body and head, as is further explained in my above mentioned patents.

At least one, but preferably plural indentations 25 are formed diametrically across the axial bore, and in this instance extend completely through respective sides of the cylindrical or slightly tapered body portion 19. The position of the indentations and their geometric form are adapted to mate with a latch element or elements 29, a preferred form of which is illustrated in FIG. 1. In this form the latch elements comprise two opposed laterally movable balls captively held in a drilled hole formed radially through a shaft 31 which has a slightly smaller diameter than the diameter of the axial bore in the bushing and is in operation extends through the bushing receiving hole 33 in the work side structural member 13. The holes or apertures 15 and 33 are misaligned generally as shown in FIGS. 1 and 3. The latch elements 29 are urged into engagement with the indentations 25 in a selected bushing by actuation of a projection 35 protruding from a handle 37 mounted on the shaft 31. Further details of the latch element, shaft and handle may be seen with reference to U.S. Pat. No. 3,509,618.

With the blind side bushing 17 inserted in the blind side structural member 11 as shown in FIG. 1, a work side bushing 39 (having a slightly tapered body portion 40 in this instance) is inserted on the shaft, with the planar surface 41 of its enlarged head portion facing rearwardly.

Also mounted on the shaft 31 is alignment collar 43 having an aperture 45 that receives the shaft 31. The collar has a large diameter shoulder 47 having an exterior surface 49, perpendicularly oriented relative to the aperture 45. In this instance the planar surface 49 of the alignment collar 43 has an indentation 51 adapted to mate with the planar surface 41 and shoulder of the work side bushing 39. Connected with the large diameter shoulder 47 is a generally cylindrical body portion 53.

Referring to FIG. 2, it may be seen that the peripheral portion of the indentation 51 (which is circular in transverse cross-section in this instance) is eccentrically aligned relative to the axial bore 45 in the collar 43, with the radial axes being offset by a distance $d$ corresponding with the amount of offset between the corresponding radial axes of the work side bushing 39.

Apparatus described thusfar is disclosed in the copending application Ser. No. 785,323, filed Dec. 19, 1968, now U.S. Pat. No. 3,590,461. The improved apparatus of this invention is shown in FIGS. 4 through 7. In FIG. 4 is shown the shaft 31 of a tool having an alignment collar 43 inserted thereon, the planar surface 49 of which is shown in engagement with the surface of the work side structural member 13. The blind side bushing 17 is shown partially inserted in the receiving opening or tapered hole 15 in the blind side structural member 11. The latch element (or elements) 29 is shown in engagement with the mating indentation in the eccentric bore of the blind side bushing 17. In addition, an adjustment bushing 55, which is in the form of a right circular cylindrical tube having a cross-sectional configuration as shown in FIG. 6, receives the shaft 31 in its interior cylindrical surface 57. The adjustment bushing 55, with exterior cylindrical surface 59 is shown extending into the hole 33 in the work side structural member 13, one end 65 of the adjustment bushing being in engagement with the planar, transverse surface 63 of the indentation 51 formed in the forward end of the alignment collar 43. The wall thickness $b$, as shown in FIG. 6, of the adjustment bushing 55 has the same wall thickness as the thinnest section $a$ separating the aperture of the axially extending bore 42 of the work side bushing 39 and its body portion 40. An identical apparatus arrangement is shown in FIG. 7, except there are a plurality (usually three) of normally equal height protrusions 67 extending generally axially from the planar surface 49 of the alignment collar 43 to the curved surface 69 of a work side structural member 71, such protrusions normally being located radially equidistant from the center line axis of alignment collar 43.

In operation and as is shown in FIG. 4, the blind side bushing 17 is shown partially inserted in the hole 15 of the blind side structural member 11, with the latch elements 29 in engagement with the mating indentations in the eccentric bore 23 of the bushing. Moreover, the alignment bushing 55 is carried by the shaft 31, with the transverse planar surface of indentation 51 of the alignment collar 43 engaging one end 65 of the adjustment bushing and the other end 61 extending into the hole 33 in the work side structural member 71. With the alignment collar, adjustment bushing, and blind side bushing thus secured to the shaft 31 of the tool, and the protrusions 67 in contact with the work, the blind side bushing 17 may be rotated through utilization of the latch elements 29 until the exterior cylindrical surface of the alignment bushing 55 engages the wall of the hole 33 in the work side structural member at 71, as shown in FIG. 4 and FIG. 7. This defines the point of resistance to the rotation of the shaft and blind side bushing, and enables removal of the shaft and the adjustment bushing for subsequent insertion of the work side bushing 39 into the hole of the work side structural members 13 and 71. The eccentric bore of the work side bushing may be aligned visually with the eccentric bore of the blind side bushing, but preferably, the shaft 31 of the tool is threaded through the eccentric bore 42 of the work side bushing 39 and thence through the work side hole 33 into the bore 23 of the blind side bushing 17. The work side bushing is then engaged with the recess 51 in alignment collar 43 and easily manipulated into its seat in work side hole 33. In addition, the alignment collar 43 may e used to check the desired perpendicular (normality) relationship between the axes of the blind side and the work side bushings and the structural members, as is explained in the above described co-pending application. Thereafter, the shaft may be removed and a fastener such as a bolt inserted in the aligned, eccentric bores.

In the above described arrangement once the exterior wall surface of the adjustment bushing strikes the wall of the work side aperture, axial alignment and normality (cocking alignment) are simultaneously assumed in the blind side bushing. Any further rotation of the tool shaft 31 causes surface 49 of the alignment collar 43 to rise from the surface 48 of the work side structural member, or similarly in the curved surface case, one of the protrusions 67 to lift from work surface 69. The recommended use of the alignment collar in insertion of the work side bushing also provides a final check on any cocking misalignments of the two bushings that might have inadvertently occurred during insertion of the work side bushing.

Protrusions 67 may be of any suitable material such as hard fiber, semi-spheroids of small diameter.

While the invention has been shown in only a few of its forms, it should be apparent to those skilled in the art that it is not so limited but is susceptible to various changes and modifications without departing from the spirit thereof.

I claim:

1. A method of assembling work side and blind side structural members having generally misaligned, fastener receiving holes through utilization of work side and blind side bushings, said method comprising the steps of:

forming eccentric, axially extending bores and exterior lateral surfaces in two bushings;

forming an indentation in a selected one of the bores, and an exterior surface of at least one of said bushings;

inserting a bushing in the hole of the blind side structural member to define the blind side bushing;

inserting an alignment collar onto a shaft;

inserting a cylindrical, adjustment bushing onto said shaft, the adjustment bushing having a uniform wall thickness that is equal to the minimum thickness defined by the eccentric bore of the work side bushing and its exterior surface;

inserting the shaft through the work side structural member into the bore of the blind side bushing;

positioning a latch element carried by the shaft within the said indentation;

positioning the alignment collar in contact with the work side structural member;

rotating the blind side bushing with the shaft until the exterior wall of the adjustment bushing engages the hole in the work side structural member;

inspecting the alignment collar for contact with the work side structural member;

retracting the shaft and the adjustment bushing from the vicinity of the structural members;

inserting a work side bushing into the receiving hole of the work side structural member with its eccentric bore axially aligned with the eccentric bore of the blind side bushing;

securing a fastener in the eccentric but aligned bores of the work side and blind side bushings.

2. The method defined by claim 1 in which the work side bushing is manipulated by the engaged alignment collar after the bushing is inserted into the hole of the work side structural member.

3. A method of assembling work side and blind side structural members having generally misaligned, fastener receiving holes through utilization of work side and blind side bushings having eccentric, axially extending bores, said method comprising the steps of:

inserting a bushing in the hole of the blind side structural member to define the blind side bushing;

inserting an alignment collar onto said shaft;

inserting a cylindrical, adjustment bushing onto a shaft that also extends into the bore of the blind side bushing, the adjustment bushing having a uniform wall thickness that is equal to the minimum thickness defined by the eccentric bore of the work side bushing and its exterior surface;

positioning a latch element carried by the shaft in engagement with the blind side bushing;

positioning the alignment collar in contact with the work side structural member;

rotating the blind side bushing with the shaft until the exterior wall of the adjustment bushing engages the hole in the work side structural member;

inspecting the alignment collar for contact with the work side structural member;

retracting the shaft and the adjustment bushing from the vicinity of the structural members;

replacing the adjustment bushing on the shaft with a work side bushing;

inserting a work side bushing into the receiving hole of the work side structural member by replacing the shaft through the work side structural member into the bore of the blind side bushing;

engaging the work side bushing with the adjustment collar and manipulating the work side bushing into the hole of the work side structural member;

securing a fastener in the aligned bores.

4. The method defined by claim 3 in which the work side bushing is manipulated by the engaged alignment collar after the bushing is inserted into the hole of the work side structural member.

* * * * *